United States Patent Office.

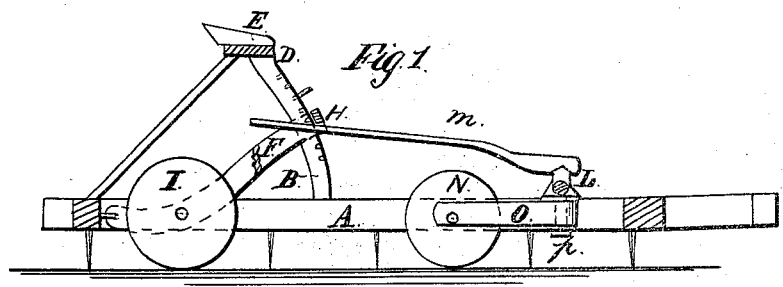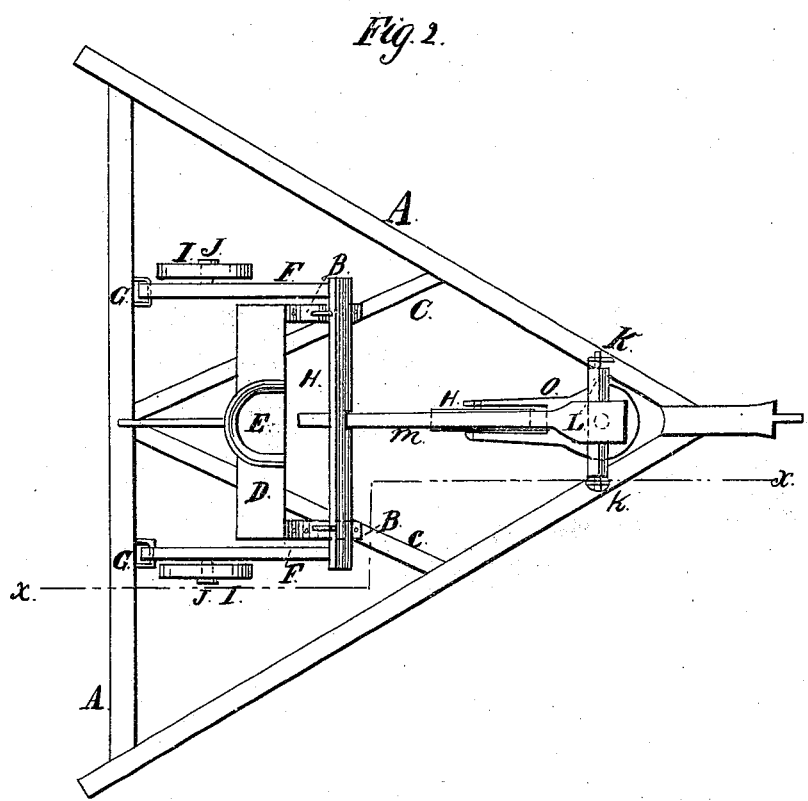

JOHN JAY AND JOEL COPPOCK, OF JONESBOROUGH, INDIANA.

Letters Patent No. 93,306, dated August 3, 1869.

IMPROVEMENT IN HARROW.

The Schedule referred to in these Letters Patent and making part of the same.

*To all whom it may concern:*

Be it known that we, JOHN JAY and JOEL COPPOCK, of Jonesborough, in the county of Grant, and State of Indiana, have invented a new and useful Improvement in Harrows; and we do hereby declare that the following is a full, clear, and exact description thereof, which will enable others skilled in the art to make and use the same, reference being had to the accompanying drawing, forming part of this specification.

This invention relates to new and useful improvements in harrows, whereby they are made much more useful than harrows of ordinary construction, and consists in the means applied for raising the harrow-teeth from the ground, either in whole or in part, as will be hereinafter more fully described.

In the accompanying sheet of drawing—

Figure 1 represents a vertical section of the harrow, through the line $x$-$x$ of fig. 2.

Figure 2 is a top or plan view.

Similar letters of reference indicate corresponding parts.

A is the frame of the harrow, which is in the ordinary triangular form, with the teeth inserted in the same, or a similar manner.

B B represent standards, supported by the cross-pieces C C of the frame, which are connected together, at their top ends, by the cross-piece D, upon which the driver's seat E is placed.

F F are levers, which are hinged to the back piece of the frame, as seen at G, and connected together, at their front ends, by the bar H, beneath the driver's feet, in front of the stands B.

I I are wheels, made of either wood or iron, which are attached to the levers F by means of suitable journal-pins J J, upon which they revolve, which pins are the fulcra of the levers.

Near the front angle of the harrow, attached to the frame by journals, as seen at $k$ $k$, is the bar L, to which is rigidly attached the lever M.

N is the guide-wheel, which is attached to the bar L by means of forked connection O and a king-bolt, $p$, so that the wheel, while it revolves on its axis in the connection O, has a lateral movement independent of the lever M.

The connection between the two is such, that by depressing the lever the front of the harrow is raised.

This the driver may do with his foot, at any time when necessary, to avoid obstructions, or to clear the harrow of accumulated grass or other rubbish.

To raise the harrow entirely from the ground, so that it will rest altogether on the wheels, it is only necessary for the driver to press with his foot on the cross-bar H.

This depresses all the levers, and raises the harrow vertically from the ground.

It will be seen that the stands B are provided with a series of holes, into which pins, above the cross-bar H, may be inserted, by which means the levers may be fastened, and the harrow supported above the ground in going to or from the field.

In this manner the depth to which the teeth are allowed to penetrate the ground, when the harrow is in use, may be gauged with the greatest nicety.

The advantages of this harrow over those of ordinary construction are many, and must be obvious to all.

Having thus described our invention,

What we claim as new, and desire to secure by Letters Patent, is—

1. The levers F, F, and M, and the wheels I, I; and N, in combination with a harrow, so connected and arranged that the harrow may be raised from the ground, either in whole or in part, substantially as shown and described.

2. The combination of the lever $m$, rock-bar L, pivot-bolt $p$, arm O, and wheel N, with the harrow, substantially as herein shown and described, and for the purpose specified.

JOHN JAY.
JOEL COPPOCK.

Witnesses:
J. H. FORD,
SETH GORDON.